United States Patent
Stearns

Patent Number: 5,941,103
Date of Patent: Aug. 24, 1999

[54] FAUCET LOCKING DEVICE

[76] Inventor: Kenneth E. Stearns, P.O. Box 1558, Frisco, Colo. 80443

[21] Appl. No.: 08/953,069

[22] Filed: Oct. 17, 1997

Related U.S. Application Data

[63] Continuation of application No. 08/638,281, Apr. 26, 1996, abandoned, which is a continuation-in-part of application No. 08/361,095, Dec. 21, 1994, abandoned.

[51] Int. Cl.[6] .................................................. F16K 35/00
[52] U.S. Cl. .............................................. 70/178; 70/175
[58] Field of Search ...................... 70/175–180; 403/375, 403/381

[56] References Cited

U.S. PATENT DOCUMENTS

| | | | |
|---|---|---|---|
| 994,409 | 6/1911 | Kelly | 70/178 |
| 1,380,675 | 6/1921 | Myers | 70/178 |
| 1,690,461 | 11/1928 | Sieben | 70/178 |
| 1,947,081 | 2/1934 | Grady et al. | 70/178 |
| 2,377,036 | 5/1945 | Quarfoot | 70/178 |
| 3,156,282 | 11/1964 | Bedford, Jr. | 403/375 |
| 4,083,211 | 4/1978 | Scherbing | 70/363 |
| 4,403,485 | 9/1983 | Scherbing | 70/68 |
| 4,462,233 | 7/1984 | Horetzke | 70/428 |
| 4,599,875 | 7/1986 | De Forrest | 70/95 |
| 4,630,456 | 12/1986 | Nielsen, Jr. | 70/178 |
| 4,803,858 | 2/1989 | Parker | 70/178 |
| 5,469,721 | 11/1995 | Pyle | 70/14 |

FOREIGN PATENT DOCUMENTS

| 368453 | 3/1932 | United Kingdom | 70/178 |
|---|---|---|---|

*Primary Examiner*—Steven Meyers
*Assistant Examiner*—Teri Pham
*Attorney, Agent, or Firm*—Brenda L. Speer

[57] ABSTRACT

The locking device of the present invention comprises a box and a lid which interlock with each other, wherein each of the box and lid has a recess therein for snugly accommodating a faucet assembly. To operate the locking device of the present invention, the box is placed upon and around a faucet assembly, the lid is aligned and interlocked with the box and then the interlocked box and lid are secured to each other by a securing device. The locking device of the present invention when mounted upon a faucet assembly and secured to itself prevents dispensing of fluids from the faucet assembly. The locking device of the present invention is preferably made of a molded, high density, glass-filled nylon plastic.

8 Claims, 3 Drawing Sheets

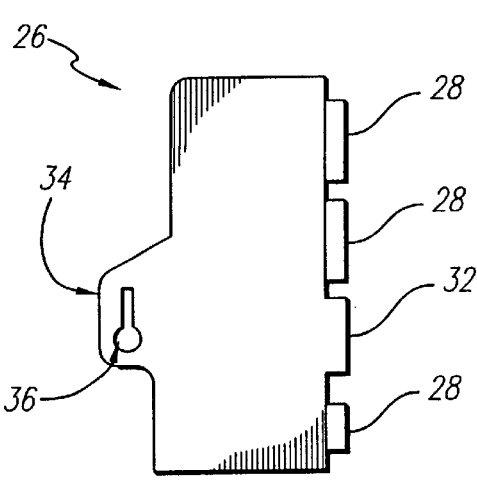
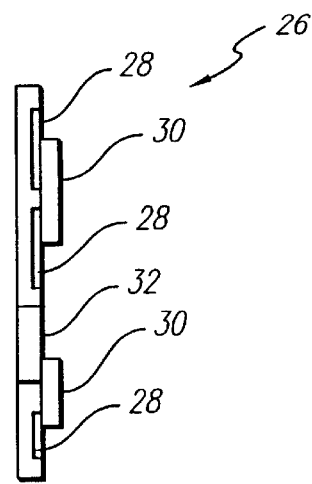
FIG. 7
FIG. 8
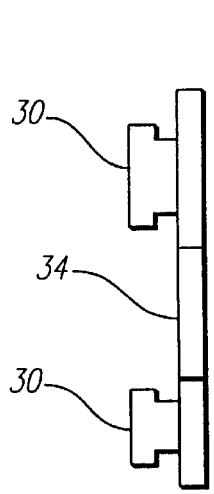
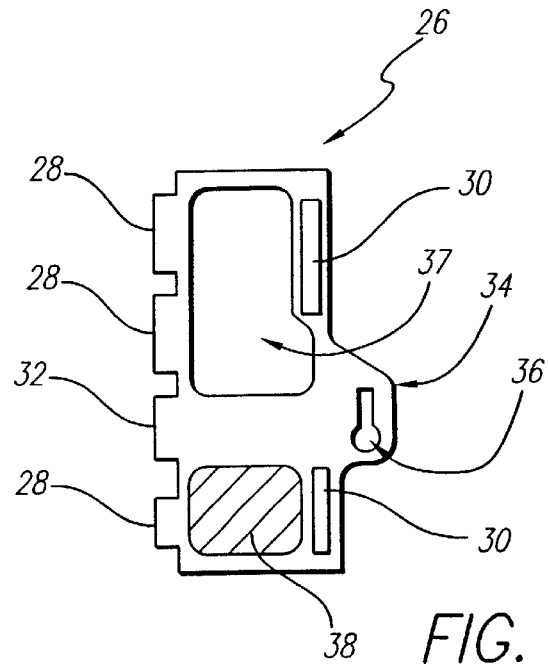
FIG. 9
FIG. 10
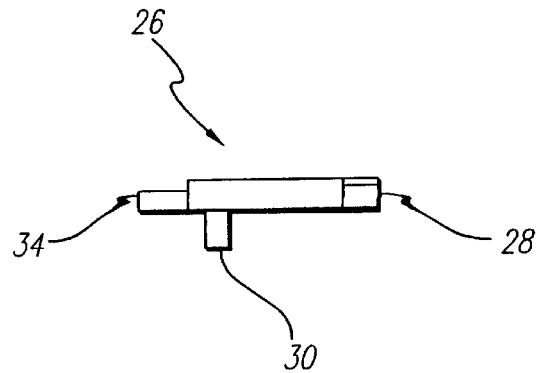
FIG. 11

FAUCET LOCKING DEVICE

RELATED APPLICATION

This application is a continuation, of application No. 08/638,281 filed Apr. 26, 1996, now abandoned, which is a continuation-in-part of application Ser. No. 08/361,095, filed Dec. 21, 1994, now abandoned.

FIELD OF THE INVENTION

The invention generally relates to a locking device for a faucet and in particular to a beverage faucet. The locking device prevents the operation and the dispensing of fluids from the faucet.

BACKGROUND OF THE INVENTION

Unauthorized dispensing of beverages is a recurring problem in food and beverage establishments. This unauthorized dispensing typically means lost profit to the establishment owner because the dispensing is usually done after operating hours.

The beverages usually dispensed without authorization are alcoholic beverages. For safety, productivity, liability and cost reasons, owners of food and beverage establishments have a need for a means to prevent unauthorized dispensing of beverages, particularly alcoholic beverages.

Securing beverage bottles is simple as the bottles can be placed in a closet, cabinet, drawer or such and locked. However, faucets which dispense beverages, such as draft beer, wine, soda and the like, are not easily secured.

There are very few locking devices for beverage faucets available and the available devices have many limitations. Presently, there is one popular device known as a beer faucet lock manufactured by Perlick, 8300 Good Hope Road, Post Office Box 23098, Milwaukee, Wis. 53223, which is used for securing beverage faucets, particularly draft beer dispensing faucets. The prior art beer faucet lock consists of a tamper proof lock and a steel locking hasp which is adjustable to fit different brands of beer faucets. The beer faucet is secured by tightening the adjustable locking hasp against the base of the dispensing faucet knob so that the knob cannot be moved, thereby preventing the dispensing of beer from the faucet.

The effectiveness of the prior art beer faucet lock is limited. A considerable amount of force must be applied to the lock in order to tighten the lock against the base of the dispensing knob, thereby preventing movement of the knob. The tightening is done with the lock key by inserting the key in the lock cylinder and then rotating the key until the back of the lock is nestled tightly against the base of the dispensing knob. Application of the requisite force to tighten the lock against the dispensing knob typically results in the key breaking off inside the lock. Obviously, this undesirable result makes the lock useless until the broken key is removed. Also, a new key must be acquired in order to be able to operate the lock again. In the meantime, an inoperable lock which is attached to the faucet prevents dispensing of fluid and creates an inconvenience to the establishment until the problem can be corrected.

Furthermore, the prior art beer faucet lock consists of a lock and a key for which there are only two, universal key options. A key to the lock can be reordered when a key breaks, but, as mentioned, there are only two, universal key options from which to chose, a pre-April 1992 or a post-April 1992 key. Since the prior art beer faucet lock is popular and prevalent, it is feasible that unauthorized personnel have ready access to these two key options and, therefore, have access to the faucet.

Additionally, the popular prior art beer faucet lock is inadequate and does not entirely prevent the dispensing of fluid from the faucet. Even when the prior art beer faucet lock is installed properly on the faucet, the knob can still be operated enough to permit some fluid to be dispensed from the faucet, thus defeating the purpose of the lock.

The prior art beer faucet lock is also awkward to use. For multiple faucets in close proximity to each other it is difficult for the lock operator to maneuver around the faucets so that the prior art beer faucet lock can be adequately secured. Also, one lock commonly obstructs installation of another lock while the lock operator tries to tighten the lock.

The prior art also discloses a lock box for an appliance. U.S. Pat. No. 4,058,993, by Stubbings for a "Lock Box", issued Nov. 22, 1977, generally discloses a lock box for an appliance, particularly a citizen's band radio. The radio is placed within the box which is then locked. However, this lock box is constructed so that the controls may be accessed while the radio is in the box and the box is permanently mounted with prison type screws to a support structure, particularly an automobile. These two features of the prior art lock box are directly contrary to those of the locking device of the present invention which denies all access to the appliance within it and which is easy to attach to and remove from the appliance or faucet encompassed by it. Accordingly, the locking device of the present invention has many advantages that overcome the deficiencies and disadvantages of the prior art locks.

SUMMARY OF THE INVENTION

In the preferred embodiment, the locking device of the present invention comprises a box having a recess therein for accommodating a faucet assembly, at least a slot for receiving and interlocking with a tab, at least a notch for accommodating a faucet assembly and a flange having at least a hole therein for receiving a securing means; and a lid having a recess therein for accommodating a faucet assembly, at least a tab for inserting within the box slot and a flange having a hole therein for receiving a securing means; wherein the box and lid interlock with one another when a lid tab is inserted within a box slot and the box and lic. are secured to each other when the box flange and the lid flange are aligned and in receipt of the securing means. Preferably, a box notch permits drainage from the device and another box notch accommodates a faucet neck of a faucet assembly.

The securing means may be a combination padlock, a keyed padlock, a combination inset cam lock, a keyed inset cam lock, a locking bar or a locking cable.

The device is preferably made of fiberglass, more preferably of dye cast metals and most preferably of plastic. In the preferred embodiment the locking device is made of a molded, high density, glass-filled nylon plastic.

BRIEF DESCRIPTION OF THE DRAWINGS

FIG. 7 is an exterior side view of the lid of the locking device of the present invention.

FIG. 8 is a rear view of the lid of the locking device of the present invention.

FIG. 9 is a front view of the lid of the locking device of the present invention.

FIG. 10 is an interior side view of the lid of the locking device of the present invention.

FIG. 11 is a bottom view of the lid of the locking device of the present invention.

DETAILED DESCRIPTION OF THE INVENTION

The locking device of the present invention has many advantages over the prior art beer faucet lock. Whereas the prior art lock secured the faucet by attempting to prevent movement of the dispensing knob, the locking device of the present invention prevents dispensing fluid from the faucet by enclosing the faucet. The locking device of the present invention completely encloses the faucet, thereby denying access to the faucet and making operation of the faucet impossible.

The locking device of the present invention encloses and is supported by a faucet, a faucet knob and a faucet neck, also known as and referred to herein as a faucet assembly. The locking device of the present invention locks to itself and not to the faucet assembly. Accordingly, the locking device of the present invention is easy to install and to remove.

The locking device of the present invention prevents operation of the faucet. Because the faucet is enclosed within the locking device of the present invention, the faucet is inaccessible and, therefore, inoperable. The locking device of the present invention may fit snugly or loosely, but preferably snugly for optimum performance, around the faucet assembly and is not removable without being unlocked. Any other removal method requires either destruction of the lock or the locking device and most likely the faucet assembly.

The locking device of the present invention may be secured by a securing means such as either a combination padlock or a lock and key padlock, a locking bar or cable, or either a combination inset cam lock or a lock and key inset cam lock which is part of the locking device of the present invention. These locking options permit the operator to select his own unique, non-universal locking method.

Figure 1:
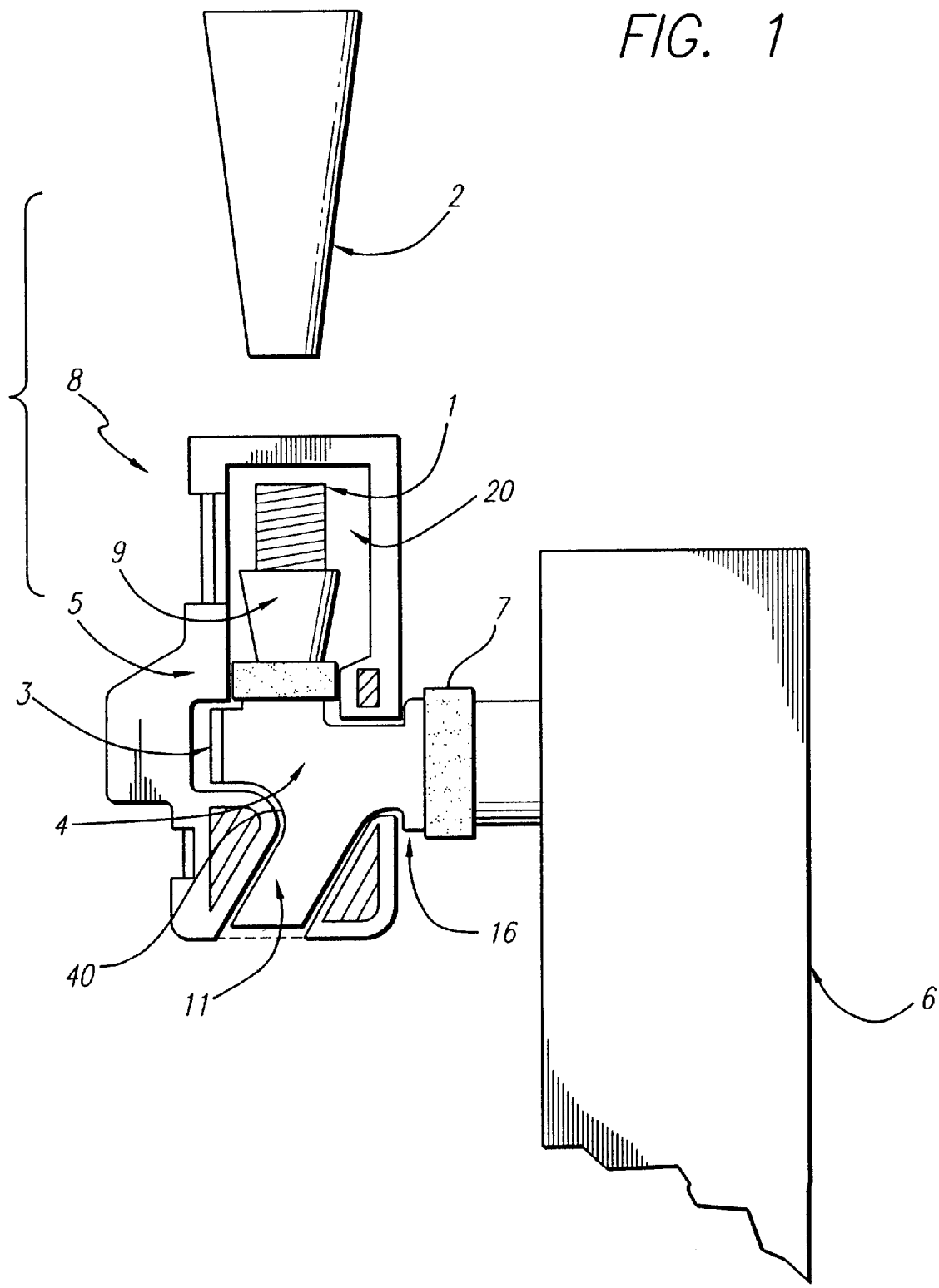
FIG. 1 an interior side view of the box of the locking device of the present invention mounted upon and enclosing a faucet assembly.

The locking device of the present invention secures a faucet assembly, in particular, a faucet assembly for dispensing draft beverages, such as beer, from unauthorized use by enclosing the faucet assembly within a box and a lid which interlock with one another as illustrated in FIG. 1. To operate the locking device of the present invention, the lever 2 is removed from a threaded portion 1 of the faucet knob 9 of the faucet assembly 4. Then the box 8 is placed upon and around a faucet 11, a faucet knob 9 and a faucet neck 7 of the faucet assembly 4. Next, the lid is placed adjacent to the box and interlocked therewith. The box 8 and lid are then secured to each other by a securing means, such as those previously discussed. The faucet assembly 4 is then enclosed within and secured by the locking device of the present invention.

The box and lid of the locking device of the present invention are each flanged. The flanges have at least one hole therein and the holes align with each other when the box and lid are in an interlocked position. A securing means is then passed through the aligned holes and locked, thereby securing the locking device of the present invention around the faucet assembly and denying access thereto. While the device is secured around the faucet assembly, dispensing of fluid from the faucet is impossible.

A preferred securing means for the locking device of the present invention is a padlock of either the lock and key or combination type. Another preferred alternative is a locking bar or cable for multiple faucet assembly securement. The bar or cable can be run through several adjacent locking devices enclosing several adjacent faucet assemblies and then the bar or cable can be locked. In the instance of the bar, the bar would have a stopper at one end to prevent the bar from sliding through the hole within the flange. At the other end of the bar would be a means to secure the bar in place, such as a hole within the bar for receiving a padlock. In the instance of the cable, the cable would lock to itself, end to end, by a securing means, such as a padlock.

In FIG. 1, the box 8 of the locking device of the present invention is enclosing a faucet assembly 4. The faucet assembly 4 shown in FIG. 1 is in conjunction with a counter-mounted tower 6 as is common for the dispensing of draft beverages, such as beer. The faucet lever 2 has been removed from the faucet knob 9 of the faucet assembly 4. The faucet assembly 4 is received within a faucet assembly recess 20 of the box 8. The faucet assembly recess 20 fits snugly about the faucet assembly 4, in particular faucet assembly notch 16 abuts the faucet neck 7 with minimal tolerance for play of the faucet neck 7 within faucet assembly notch 16. Also, the faucet assembly recess 20 fits snugly about the faucet nut 5 with minimal tolerance for play of the faucet assembly 4 within the faucet assembly recess 20. However, ample room is preferably provided for a faucet plunger 3 of the faucet assembly 4 within the faucet assembly recess 20. It is preferable that the faucet plunger 3 does not abut a boundary of the faucet assembly recess 20 or 37 in order to prevent depression of the faucet plunger 3 and thereby the dispensing of fluid from the faucet assembly 4 in contravention of the purpose of the present invention should the box 8 be able to be moved or rocked upon the faucet assembly 4 when the locking device of the present invention is secured upon the faucet assembly 4. The faucet recess abuts a crook 40 of the faucet with minimal tolerance for play.

Figure 2:
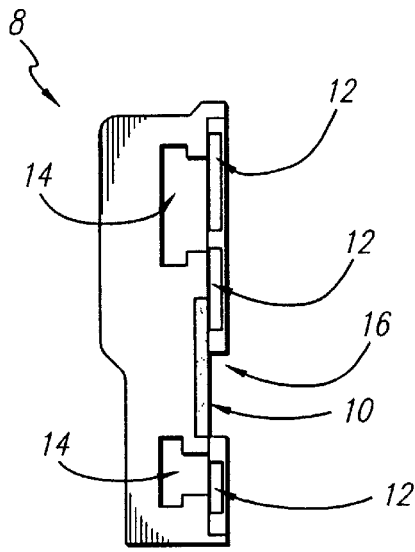
FIG. 2 is a front view of the box of the locking device of the present invention.

The box 8 of the locking device of the present invention is further illustrated in FIGS. 2 through 6. FIG. 2 is a front view of the box 8 having tab slots 12, winged tab slots 14, flange 10 and faucet assembly notch 16.

Figure 3:
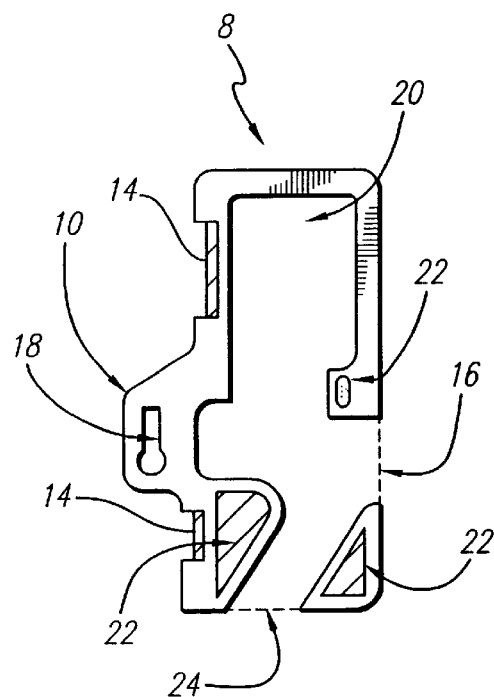
FIG. 3 is an interior side view of the box of the locking device of the present invention.

FIG. 3 is an interior side view of the box 8 having winged tab slots 14, box flange 10, box lock hole 18 within box flange 10, faucet assembly recess 20, faucet assembly notch 16, and drainage notch 24. Mass reduction cores 22 are optional and may be included within the box 8 should it be desirable to reduce the mass of the box 8. It is often preferable to reduce mass in an instance where the locking device of the present invention is made of plastic, because plastic is typically stronger when it has less mass or is thinner in width. This seemingly contrary result is because plastic cures better when it is thinner in width. If the plastic is thicker, then when it cures it tends to have soft spots in its interior which weaken the strength of the plastic.

Figure 4:
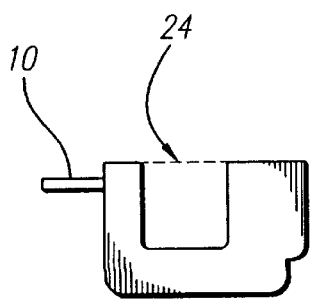
FIG. 4 is a bottom view of the box of the locking device of the present invention.

FIG. 4 is a bottom view of box 8 having flange 10 and drainage notch 24.

Figure 5:
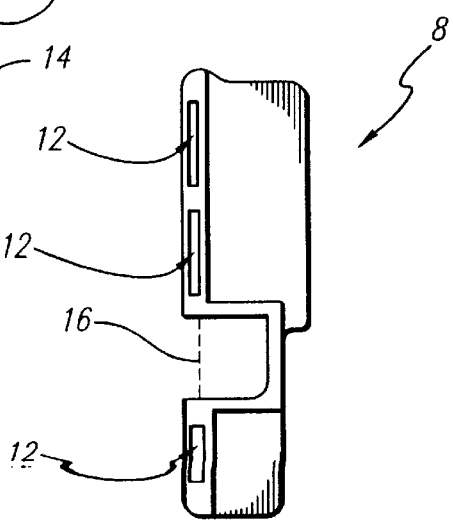
FIG. 5 is a rear view of the box of the locking device of the present invention.

FIG. 5 is a rear view of the box 8 having tab slots 12 and faucet assembly notch 16.

Figure 6:
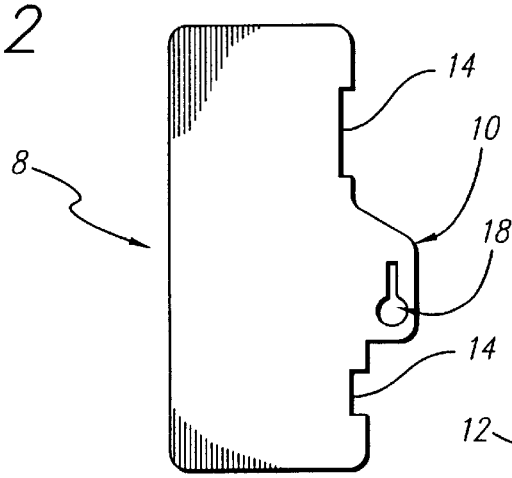
FIG. 6 is an exterior side view of the box of the locking device of the present invention.

FIG. 6 is an exterior side view of the box 8 of the locking device of the present invention. The box 8 has box flange 10, box lock hole 18, and winged tab slots 14.

FIG. 7 is an exterior side view of a lid 26 of the locking device of the present invention. The lid 26 has tabs 28, faucet assembly notch closure 32, lid flange 34 and lid lock hole 36 within lid flange 34.

FIG. 8 is a rear view of the lid 26 having tabs 28, faucet assembly notch closure 32 and winged tabs 30.

FIG. 9 is a front view of the lid 26 having winged tabs 30 and lid flange 34.

FIG. 10 is an interior side view of lid 26 having lid flange 34, lid lock hole 36, winged tabs 30, tabs 28, faucet assembly notch closure 32 and faucet assembly recess 37. Mass reduction core 38 is optional and may be included within the lid 26 should it be desirable to reduce the mass of the lid 26.

To operate the locking device of the present invention, the box 8 is placed upon the faucet assembly 4. The lid 26 is then aligned next to the box 8 in an offset manner. The tabs 28 of the lid 26 are slid into slots 12 of the box 8 and the winged tabs 30 of the lid 26 are slid into slots 14 of the box 8 until box flange 10 and lid flange 34 are aligned with one another and faucet assembly notch 16 and faucet assembly notch closure 32 also align with one another. A securing means is then passed through aligned box lock hole 18 as aligned with lid lock hole 36.

The winged tabs 30 within winged slots 14 prevent any vertical or lateral movement of the box 8 and lid 26 in relation to one another. It is preferable that the winged tabs 30 are winged, although they need not be. The wings on the tabs prevent the locking device of the present invention from being pried open along the plane where the box 8 and lid 26 abut when interlocked with one another by preventing the winged tabs 30 from being slid out of slots 14. The tabs 28 within slots 12 also prevent any vertical or lateral movement of the box 8 and lid 26 in relation to one another. Accordingly, the locking device of the present invention is not moveable once it is mounted upon a faucet assembly 4 and secured.

The box recess 20 and the lid recess 37 accommodate the bulk of the faucet assembly 4, but firmly secure the box 8 and lid 26 upon the faucet assembly 4. The faucet assembly notch 16 of box 8 accommodates a neck of a faucet assembly 4. The drainage notch 24 of box 8 is optional and it permits drainage of any fluids which may leak from the faucet assembly 4 thereby preventing corrosion damage to the faucet assembly 4 and allowing for compliance with various health and safety regulations regarding beverage dispensers.

When the box 8 and lid 26 of the locking device are placed upon a faucet assembly 4, interlocked with one another and secured together by a securing means, movement of the interlocked box 8 and lid 26 apart from and in relation to one another is limited to the play of the securing means within the lock holes 18 and 36 as aligned with one another. Therefore, it is preferable that the securing means have minimal, if any, play or tolerance within the lock holes 18 and 36. Minimization of such play eliminates any movement of the box 8 and lid 26 in relation to one another and denies access to the faucet assembly 4 as enclosed within the interlocked box 8 and lid 26.

A custom padlock and key is the preferred means to secure the locking device of the present invention. With a custom padlock and key, the locking device is not easily accessible, as would be the case with common or prefabricated combination type or lock and key type padlocks. Other means for securing the locking device of the present invention are available, such as inset cam locks of the type commonly used in thermostat covers, postal boxes, filing cabinets, etc. Such alternative locking means preferably would be installed within the box 8 of the locking device of the present invention. To do so, the locking means could be placed within flange 10 or the locking means could be mounted upon the box 8. In the later configuration, flange 10 would not be necesary.

The locking device of the present invention may be made out of any suitable material which is solid, rigid, durable, impenetrable, impact resistant and shatterproof. A preferable material is fiberglass. More preferred materials are metals which may be dye cast, such as stainless steel, copper, brass, aluminum or other suitable metal having the aforementioned characteristics. The most preferred material is plastic.

In a preferred embodiment, the locking device of the present invention is made of a molded, high density, glass-filled nylon plastic. Glass-filled nylon plastic is extremely strong with the strength varying in direct relation to the glass content of the plastic. The glass content of the plastic may be from about a 5 percent to about a 35 percent glass content, more preferably from about a 15 percent to about a 25 percent glass content and most preferably about a 20 percent glass content. In practice, the preferred embodiment of the locking device of the present invention has demonstrated more than adequate strength and resistance to tampering or destruction when made from about a 2C percent glass-filled nylon plastic.

In the preferred embodiment of the locking device of the present invention, the edges and corners of the box 8 and lid 26 are rounded for aesthetic purposes and also in order to reduce the possibility of injury to an operator of the locking device of the present invention. Less preferably, the edges and corners of the locking device of the present invention may be squared.

Many variations of the size, shape, dimensions and attributes of the locking device of the present invention which would accommodate and secure various faucet assemblies would be obvious to one skilled in the art. Such obvious variations are numerous and are intended to be covered by the disclosure and claims of the present invention and are not limited to the examples stated herein.

The embodiments illustrated and discussed in the specification are intended only as exemplary and the many other feasible embodiments within the scope of this invention will be readily understood and appreciated by those having ordinary skill in the art. Nothing in the specification should be construed as limiting the scope of the present invention. Many changes may be made by those having ordinary skill in the art to produce a highly effective apparatus for securing a faucet assembly without departing from the present invention. Accordingly, the present invention should be limited only by the claims.

I claim:

1. A faucet locking device in combination with a draft beer dispensing faucet comprising:
    a. a box having a recess adapted to conform to and snugly accommodate the draft beer dispensing faucet assembly, at least one slot, at least one winged slot, a notch adapted to accommodate a faucet neck of the faucet assembly, and a flange having a hole to receive a securing means; and b. a lid having a recess adapted to conform to and snugly accommodate the faucet assembly, at least one tab which interlocks with the at least one box slot, at least one winged tab which interlocks with the at least one winged box slot, a faucet assembly notch closure which aligns with the faucet assembly notch, and a flange having a hole to receive the securing means;

wherein the box and the lid enclose the faucet assembly and are secured to each other when the lid tab interlocks with the box slot, the winged lid tab interlocks with the winged box slot, the faucet assembly notch closure aligns with the faucet assembly notch, and the box flange hole and the lid flange hole align with each other to receive the securing means;

and the box recess is comprised of three interconnected recesses which include a faucet recess adapted to conform to and snugly accommodate a faucet of the faucet assembly, a faucet knob recess adapted to conform to and snugly accommodate a faucet knob of the faucet assembly and a faucet plunger recess adapted to conform to and amply accommodate a faucet plunger of the faucet assembly such that the faucet knob recess abuts a faucet nut of the faucet assembly with minimal tolerance for play;

further wherein the faucet locking device is for attachment to said faucet assembly.

2. A device as claimed in claim 1 further comprising a notch within the box to permit drainage from the device.

3. A device as claimed in claim 1 further wherein vertical and lateral movement of the box and lid in relation to one another is prevented when the box and lid are interlocked with each other.

4. A device as claimed in claim 1 further wherein the lid recess is comprised of a faucet knob recess adapted to conform to and snugly accommodate a faucet knob of the faucet assembly.

5. A device as claimed in claim 1 further wherein the faucet assembly notch abuts the faucet neck with minimal tolerance for play.

6. A device as claimed in claim 1 further wherein the faucet recess abuts a crook of the faucet with minimal tolerance for play.

7. A device as claimed in claim 1 further wherein the faucet plunger recess is adapted to prevent abutment of a boundary of the faucet plunger recess with the faucet plunger.

8. A faucet locking device in combination with a draft beer dispensing faucet comprising:

a. a box having a recess adapted to conform to and snugly accommodate the draft beer dispensing faucet assembly, at least one slot, at least one winged slot, a notch adapted to accommodate a faucet neck of the faucet assembly, and a flange having a hole to receive a securing means; and b. a lid having a recess adapted to conform to and snugly accommodate the faucet assembly, at least one tab which interlocks with the at least one box slot, at least one winged tab which interlocks with the at least one winged box slot, a faucet assembly notch closure which aligns with the faucet assembly notch, and a flange having a hole to receive the securing means;

wherein the box and the lid enclose the faucet assembly and are secured to each other when the lid tab interlocks with the box slot, the winged lid tab interlocks with the winged box slot, the faucet assembly notch closure aligns with the faucet assembly notch, and the box flange hole and the lid flange hole align with each other to receive the securing means;

and the box recess is comprised of three interconnected recesses which include a faucet recess adapted to conform to and snugly accommodate a faucet of the faucet assembly, a faucet knob recess adapted to conform to and snugly accommodate a faucet knob of the faucet assembly and a faucet plunger recess adapted to conform to and amply accommodate a faucet plunger of the faucet assembly such that the faucet plunger recess is adapted to prevent abutment of a boundary of the faucet plunger recess with the faucet plunger;

further wherein the faucet locking device is for attachment to said faucet assembly.

* * * * *